United States Patent [19]

Meier

[11] Patent Number: 4,665,895

[45] Date of Patent: May 19, 1987

[54] ELLIPSOIDAL SOLAR DISH CONCENTRATOR

[75] Inventor: Rudolf H. Meier, Santa Ana, Calif.

[73] Assignee: McDonnell Douglas Corporation, Long Beach, Calif.

[21] Appl. No.: 653,026

[22] Filed: Sep. 21, 1984

[51] Int. Cl.[4] .............................................. F24J 2/10
[52] U.S. Cl. .................................... 126/438; 126/449; 126/417
[58] Field of Search ............... 126/438, 451, 442, 439, 126/449, 417; 350/613, 629, 630, 636

[56] References Cited

U.S. PATENT DOCUMENTS

| 3,134,906 | 5/1964 | Henker | 126/438 X |
|---|---|---|---|
| 3,990,430 | 11/1976 | Roberston | |
| 4,018,212 | 4/1977 | Hein et al. | 126/451 |
| 4,089,047 | 5/1978 | Liidentz | |
| 4,099,516 | 7/1978 | Caulier | |
| 4,130,107 | 12/1978 | Rabl et al. | |
| 4,164,934 | 8/1979 | Anderson | |
| 4,340,034 | 7/1982 | Hopper | |
| 4,385,808 | 5/1983 | Vanderwerp | |
| 4,452,232 | 6/1984 | David | 126/451 X |

FOREIGN PATENT DOCUMENTS

| 25961 | 5/1920 | Denmark |
| 808701 | 5/1951 | Fed. Rep. of Germany |
| 864684 | 12/1952 | Fed. Rep. of Germany |

Primary Examiner—Larry Jones
Attorney, Agent, or Firm—Benjamin Hudson, Jr.; George W. Finch; Donald L. Royer

[57] ABSTRACT

A solar dish concentrator is provided having a rotationally symmetrical elliptical shape for focusing an uniform flux density of solar radiation on a receiver. The solar flux pattern reflected to the receiver is evenly distributed over the four quadrants of the receiver without containing any hot spots.

12 Claims, 6 Drawing Figures

ELLIPSOIDAL SOLAR DISH CONCENTRATOR

BACKGROUND OF THE INVENTION

1. Field of the Invention

This invention relates generally to solar dish concentrators that focus solar radiant energy upon a collector and more particularly to an ellipsoidal concentrator that projects an uniform radiant flux onto an annulus shaped receiver body.

2. Description of the Prior Art

Solar energy collecting apparatus is well-known in the art. Traditional solar collectors utilize a reflector which focuses solar energy upon heat exchanging apparatuses. The reflector may be a parabolic, elliptical, or a circular cylindrical type mirror. The efficiency of the traditional solar collector is determined by the percentage of incident solar radiation that can be focused on the heat exchanging apparatus. The heat exchanging apparatus normally consists of tubes located at the focus point of the solar collector which carry a heat conducting fluid.

The principal object of prior art solar collectors is to focus a maximum amount of solar radiation to a single focus point where the heat exchanging apparatus is located. To accomplish this, various collector shapes have been utilized and in addition sun tracking systems have been used to control the angle of incident solar radiation to maximize the efficiency of the system.

New receiver-solar engine combinations based on the Sterling Engine Principle have been developed that require a uniform flux density having a peculiar shape of the concentrated solar flux pattern which can best be described as a concave annulus. These new receivers require that the solar radiation be evenly distributed over the four quadrants of the receiver without any hot spots. The traditional concentrators cannot meet these demands. A variety of paraboloidal and spheroidal concentrators have been developed, but none have been completely successful at creating the proper flux pattern. It would be desirable if a solar dish concentrator were provided that focused a uniform flux density on a receiver.

SUMMARY OF THE INVENTION

There is provided by this invention a solar dish concentrator based on the ellipsoid's properties of finite conjugate imagery. It is rotationally symmetrical and is designed to focus a uniform flux image of an annulus shaped plane on an annulus shaped receiver body.

BRIEF DESCRIPTION OF THE PREFERRED EMBODIMENT

Figure 1:
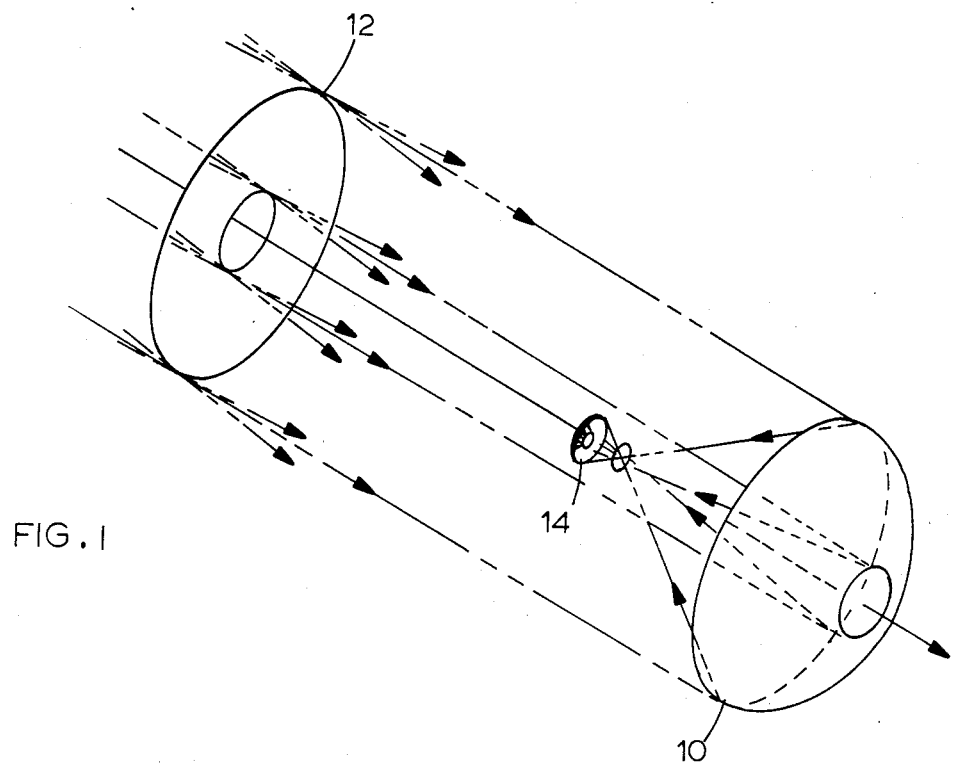
FIG. 1 illustrates an elliptical solar dish concentrator incorporating the principles of this invention.
Figure 2:
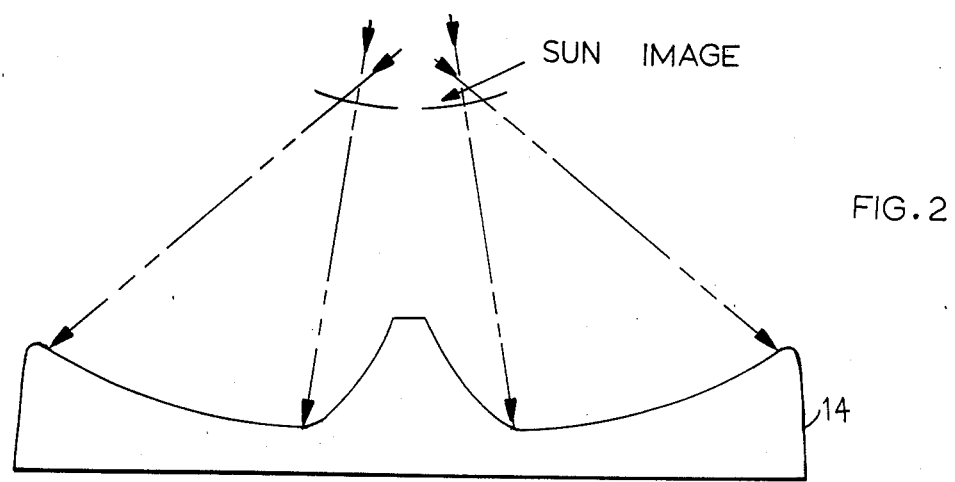
FIG. 2 illustrates a typical concave annulus receiver body.

Referring to FIG. 1, there is shown an ellipsoidal solar dish concentrator 10 incorporating the principles of this invention. The solar dish concentrator 10 has a design based on the ellipsoid's properties of finite conjugate imagery. It is rotationally symmetrical and is designed to focus a uniform flux image of an annulus shaped plane on an annulus shaped receiver body. Instead of forming a perfect image of the sun at its focal point as the traditional concentrators do, it is designed to form an image of an imaginary annulus shaped object plane 12 at the surface of the concave annulus shaped receiver body 14. The object plane 12 is located at some distance in space between the sun and the concentrator 10. Since this plane is uniformly irradiated by the sun, with properly designed optics its image will also have a uniform radiant flux pattern. The shape of the typical receiver body 14 is shown in FIG. 2.

The object plane 12 is located at a distance from the concentrator that corresponds to the distance to the concentrator's far focal point. The required demagnification is the ratio of the object annulus width to the receiver annulus width, $R_{OBJ}/R_{IMG}$, where $R_{OBJ}$ is the width of the object annulus 12 and $R_{IMG}$ is the width of the image annulus. The demagnification determines the ratio of the ellipsoid's far focal point distance to its near focal point distance, measured from its vertex. Optically, an ellipsoid will form a better, more uniform image of an object that is located at a finite distance than either a spheroid or a paraboloid. The image of an extended plane will, of course, not be perfect, but this will have very little or no effect on the uniformity of the overall flux distribution across the image. The rather simple design approach shown in FIG. 1 makes the concentrator an ellipsoid whose far focal point $F_{OBJ}$ lies at the center of the object plane annulus 12 and whose near focal point $F_{IMG}$ thus coincides with the center of the annular receiver body 14. The central cone section of the annular receiver body 14 should not be appreciably irradiated. In this configuration, the perfectly imaged conjugate points $F_{OBJ}$ and $F_{IMG}$ would be obscured and thus not actually contribute to the image. Also, this would require matching the sides of the central obscured area of the concentrator to that of the forbidden central cone section of the receiver body, resulting in undesirable large concentrator obscuration (about 3.0 meter diameter for an 11.0 meter diameter dish or about 7.5 %).

Figure 3:
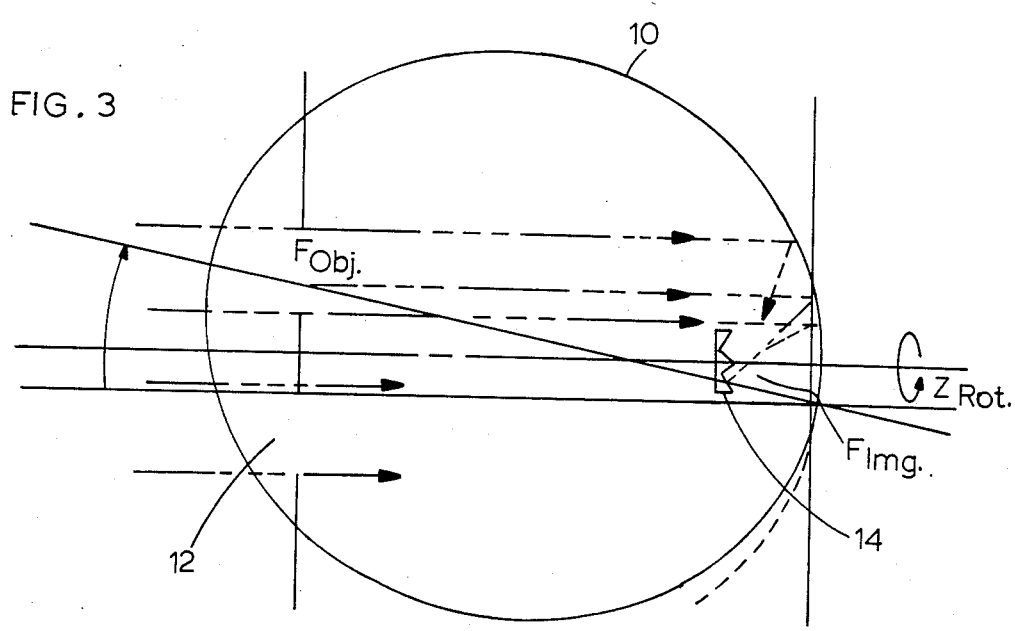
FIG. 3 illustrates a tilted ellipsoid solar concentrator.

Referring to FIG. 3, a better approach of almost equal simplicity is shown that makes $F_{OBJ}$ and $F_{IMG}$ conjugate ring zones. This can be achieved by tilting the ellipse formed by a cut through the center plane of the ellipsoid slightly such that $F_{OBJ}$ lies either inside or at one periphery of the object plane annulus 12 and $F_{IMG}$ lies inside or at the corresponding periphery of the receiver body annulus 14, but of course at the opposite side of the optical center line. This is permissible due to the small angular subtense (32 minutes of arc) of the sun radiation. No radiation originating from one side of the object plane annulus 12 can reach the opposite side of the concentrator. If this tilted ellipse is now rotated about an axis that is parallel to the original Z axis, but shifted side ways to go through the center of the receiver body, thus forming the optical centerline of the dish, the surface created by the convolution of its outward tilted quadrant will be that of the desired dish concentrator. The location of the center of the receiver body 14 can be found by considering that the foci of the tilted ellipse must coincide with both selected conjugates of the object plane annulus 12 and the receiver body annulus 14.

The most useful form of the general equation of an ellipse for optical application is $$y^2 - 2rz + Pz^2 = 0 \qquad (1)$$

Figure 4:
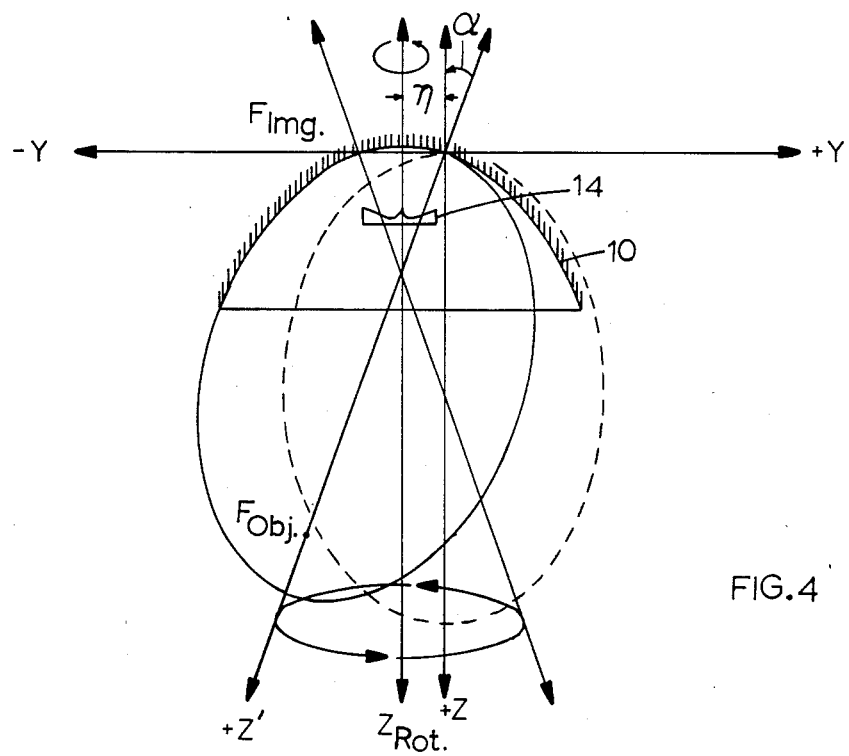
FIG. 4 illustrates the generation of the ellipsoidal concentrator's surface.

In this form the ellipse is tangent to the y-axis at the vertex and symmetrical about the z-axis (dotted ellipse in FIG. 4). The constants in Eq. (1) are r = radius of curvature at the vertex (y = z = 0)
$P = 1 - e^2$ (P > 0 for ellipse)
e = numerical eccentricity = c/a
c = linear eccentricity
a = major half-axis (coincident with z-axis for 0 < P < 1)

Figure 5:
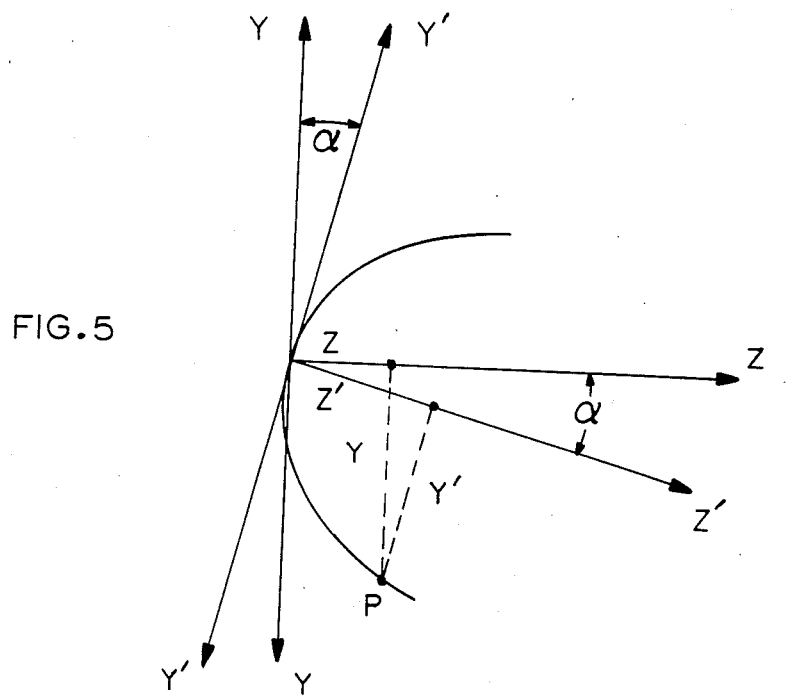
FIG. 5 illustrates the transformation of the ellipsoidal concentrator coordinates.

If the ellipse is now tilted clockwise about the x-axis in the yz-plane through an angle $\alpha$, the yz-coordinate system will appear to be rotated counterclockwise through angle minus $\alpha$ and thus be transformed as follows (FIG. 5)

$x' = x$ $z' = z \cos \alpha + y \sin \alpha$ or $z = z' \cos \alpha - y' \sin \alpha$ $y' = y \cos \alpha - z \sin \alpha$ or $y = y' \cos \alpha + z' \sin \alpha$ Eq. (1) now transforms to $$(y' \cos \alpha + z' \sin \alpha)^2 - 2r(z' \cos \alpha - y' \sin \alpha) + P(z' \cos \alpha - y' \sin \alpha)^2 = 0 \qquad (2)$$

Rotating the outward tilted quadrant (negative y-values) of the ellipse about an axis called $z_{ROT}$ (FIG. 4) will generate the desired surface of the concentrator. Naming the parallel shift of the z-axis to $z_{ROT}$, $\eta$, the equation defining the concentrator surface can be written $$x^2 + [y' - \eta) \cos \alpha + z' \sin \alpha]^2 - 2r[z' \cos \alpha - (y' - \eta) \sin \alpha] + P[z' \cos \alpha (y' - \eta \sin \alpha]^2 = 0 \qquad (3)$$

Figure 6:
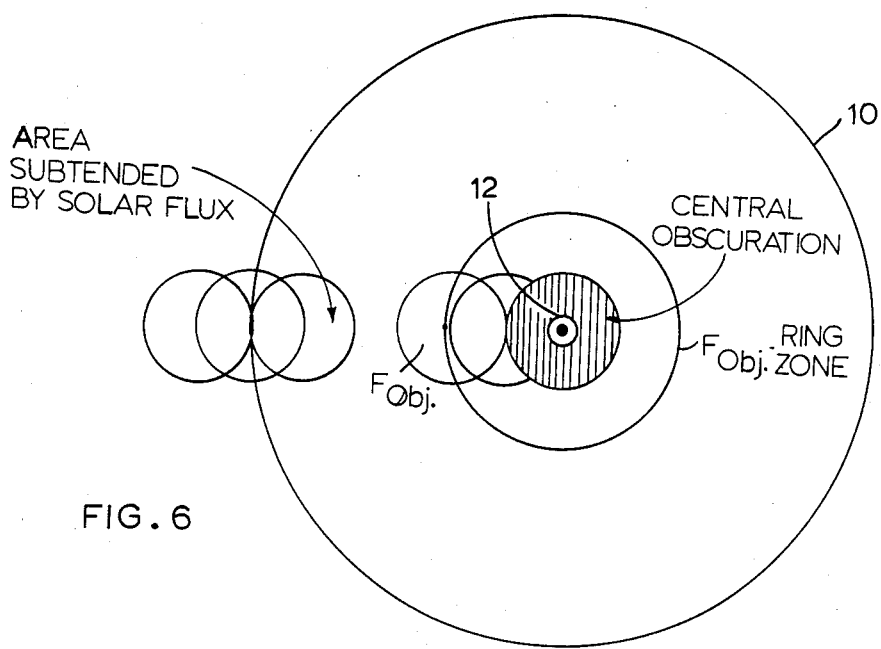
FIG. 6 illustrates the radial vignetting of the ellipsoidal concentrator.

The magnitude of angle $\alpha$ and with it the magnitude of $\eta$ depends on the selected location of $F_{OBJ}$ within the object plane annulus 12. At first glance, a good choice of the ring zone that should be imaged perfectly would be a median ring somewhere between the inner and outer periphery of the annulus (see e.g., FIG. 3), but since the image of a plane surrounding the far focal point of an ellipsoid forms a spherical surface around its near focus with a radius of curvature which very closely matches that of a typical concave receiver body 14, it appears to be more prudent to let $F_{OBJ}$ be the innermost ring that irradiates the dish without vignetting (FIG. 6). This in turn causes $F_{IMG}$ to coincide with the inner fully irradiated ring zone of the receiver body annulus 12.

Since there is no actual physical aperture stop at the location of the fictitious object plane 12, the radiant flux reflected by the concentrator toward the receiver body will show vignetting (FIG. 6). The radial rise from zero to maximum flux and conversely is determined by the subtense of the solar angle at the concentrator for radiation thought to emerge at the object plane.

The major baseline parameters of a representative concentrator based on the foregoing design principle are listed in Table 1.

TABLE 1
BASELINE PARAMETERS

| | |
|---|---|
| Overall Diameter | 11.00 m |
| Obscured Central Section | 2.00 m |
| Total Collecting Area | 91.89 m² |
| Object Plane annulus | |
| Outer Diameter | 11.00 m |
| Inner Diameter | 2.00 m |
| Receiver body Annulus | |
| Outer Diameter | 0.41 m |
| Inner Diameter | 0.11 m |
| Demagnification | 30 × |
| Basic Ellipse | |
| Near Focus $F_{IMG}$ | 7.00 m |
| Far Focus $F_{OBJ}$ | 210.00 m |
| Major Semi-Axis a = ½($F_{IMG}$ + $F_{OBJ}$) = | 108.50 m |
| Linear Eccentricity c = c/a | 0.93548 |
| Radius of Curvature at Vertex | 13.50 m |
| $P = 1 - e^2$ | 0.124870 |
| Dish Area Diameter Irradiated from Object Plane Point | 1.95 m |
| Flux Rise Dimension Across Peripheries of Receiver | 0.06 m |
| Tilt Angle of Basic Ellipse (see FIGS. 3 and 4) | |
| $\alpha = \sin^{-1}\left[\dfrac{2.00 + 0.088}{203}\right] =$ | 0.59° |
| Sun Image Distance from Vertex of Dish = 700 − 22.6 cm = | 677.4 cm |
| Parallel Shift of z Axis of Ellipse to $z_{ROT}$ (FIG. 4) $\eta = 0.088 + 7 \sin\alpha =$ | 0.160 m |
| Diameter of Ring Shaped Image of a point at the cent of the object plane. | 4.2 cm |

With no physical aperture stop at the object plane 12, the annular image at the receiver body 14 will exhibit radial vignetting because of the dish's finite aperture and central obscuration.

It has been found that the geometric image spot size of ech point of the object plane annulus varies very little with its literal distance from $F_{OBJ}$, the ellipses far local point. Thus, it can be expected that the surface defined by Eq. (3) promises to generate not only a flux pattern of high circular uniformity but also of high radial uniformity.

The first order estimate of permissible manufacturing and alignment errors will be given in the next section.

The following are allowable manufacturing and alignment tolerances for the concentrator 10. The most damaging surface errors are obviously departures from the circular symmetry of the concentrator. Fortunately, this symmetry is relatively easy to achieve and also to maintain.

More difficult to generate and to maintain is the shape of the z = f(y) curve. In order to get some feeling for how much departure from the ideal curve can be tolerated, the actual value of z at the dish periphery (y = 5.5 m) will be given for a sphere, a parabola, a non-tilted ellipse and a tilted ellipse.

1. Sphere
The equation for a sphere that is tangent to the y-axis at z = 0 is $$(z - r)^2 + y^2 = r^2 \qquad (4)$$

Setting r = 13.5 m and y = 5.5 m (from Table 1) yields $z = 1.171$ m

2. Parabola
The equation for the equivalent parabola is $$y^2 - 2rz = 0 \qquad (5)$$

With the same values for r and y one obtains $$z = 1.120 \text{ m}$$

3. Non-Tilted Ellipse

The non-tilted ellipse is defined by Eq. (1). Again, from Table 1, setting $r = 13.5$ m, $y = 5.5$ m, and $P = 0.12487$, yields $$z = 1.126 \text{ m}$$

4. Tilted Ellipse

The tilted ellipse is defined by $$[(y'-\eta)\cos\alpha + z'\sin\alpha]^2 - 2r[z'\cos\alpha - (y'-\eta)\sin\alpha] + P[z'\cos\alpha - (y'-\eta)\sin\alpha]^2 = 0 \quad (6)$$

From Table 1: $\cos\alpha = 0.999947$, $\sin\alpha = -0.010297$, $y' - \eta = -5.66$ m.

This yields $$z = 1.135 \text{ m}.$$

Thus, the difference in z of a non-tilted paraboloid and a tilted ellipsoid at the outer rim of the concentrator is $$\Delta z = 15 \text{ mm}.$$

This suggests that on a realistic basis the error in z at the outer rim should be held within ±3 mm. An error of ±3 mm in z can roughly be translated into an angular error of the surface normal of about ±0.6 mrad or an angular beam deviation of ±1.2 mrad. This corresponds at the receiver body surface to a radial blur of about ±8.4 mm, a quite acceptable value.

Obviously, since the concentrator will have to be fabricated and assembled from smaller mirror segments, one should require that the surface contour of each segment deviates not more that about ±0.5 millimeter from its prescribed value. Assuming replica type manufacturing methods, this tolerance appears to be rather easy to maintain.

Although there has been illustrated specific detail and structure of operation, it is clearly understood that the same were merely for purposes of illustration and that changes and modifications may be readily made therein by those skilled in the art without departing from the spirit and scope of this invention.

What I claim is:

1. A device for collecting and concentrating radiant energy, comprising:
    (a) A rotationally symmetrical elliptical reflecting means for focusing radiant energy into a uniform flux image of an annulus-shaped object plane from a radiant source said reflecting means having a near focal point; and
    (b) A generally concave annulus-shaped receiver means mounted between the radiant source and the reflecting means for receiving the focused radiant energy such that the near focal point of the reflecting means coincides with the center of the generally concave annulus shaped receiver means.

2. A device for collecting and concentrating radiant energy as recited in claim 1 wherein the receiver means is a generally concave annular shape comprised of a generally conical center section protruding therefrom.

3. A device for collecting and concentrating radiant energy, comprising:
    (a) A generally ellipsoidal rotationally symmetrical reflecting means having a near focal point and having a configuration generated by rotating a tilting elliptical plane whereby the axis of rotation is shifted from the vertex for focusing radiant energy into a uniform flux pattern from a radiant source; and
    (b) A receiver means mounted in close proximity to the reflecting means for receiving the focused radiant energy, said receiver having a concave annulus shaped surface mounted near the focal point of the reflecting means such that the near focal point of the reflecting means coincides with the center of the generally concave annulus.

4. A device for collecting and concentrating radiant energy as recited in claim 3 wherein the far focal point of the reflecting means is inside of an imaginary annular object plane located between the radiant source and the reflecting means.

5. A device for collecting and concentrating radiant energy as recited in claim 4 wherein the near focal point of the reflecting means is inside of the generally concave annular shaped receiver means.

6. A device for collecting and concentrating radiant energy as recited in claim 5 wherein receiver means is a generally concave annular shape comprised of a generally conical center section protruding therefrom.

7. A device for collecting and concentrating radiant energy as recited in claim 4 wherein the receiver means is a generally concave annular shape comprised of a generally conical center section protruding therefrom.

8. A device for collecting and concentrating radiant energy as recited in claim 3 wherein the far focal point of the reflecting means is one periphery of an imaginary annular object plane located between the radiant source and the reflecting means.

9. A device for collecting and concentrating radiant energy as recited in claim 8 wherein the near focal point of the reflecting means is one periphery of the generally concave annular shaped receiver means.

10. A device for collecting and concentrating radiant energy as recited in claim 8 wherein the receiver means is a generally concave annular shape comprised of a generally conical center section protruding therefrom.

11. A device for collecting and concentrating radiant energy as recited in claim 9 wherein the receiver means is a generally concave annular shape comprised of a generally conical center section protruding therefrom.

12. A device for collecting and concentrating radiant energy as recited in claim 3 wherein the receiver means is a generally concave annular shape comprised of a generally conical center section protruding therefrom.

* * * * *

UNITED STATES PATENT AND TRADEMARK OFFICE
CERTIFICATE OF CORRECTION

PATENT NO. : 4,665,895
DATED : 19 May 1987
INVENTOR(S) : Rudolf H. Meier

It is certified that error appears in the above—identified patent and that said Letters Patent is hereby corrected as shown below:

Column 4, line 37, the word "ech" should be --each--.

line 38, the word "literal" should be --lateral--.

line 38, the word "local" should be --focal--.

Column 6, line 12, (Claim 3) the word "tilting" should be --tilted--.

Signed and Sealed this

Twenty-ninth Day of September, 1987

*Attest:*

DONALD J. QUIGG

*Attesting Officer*     *Commissioner of Patents and Trademarks*